United States Patent [19]

Gautheron et al.

[11] Patent Number: 5,491,577
[45] Date of Patent: Feb. 13, 1996

[54] TUNABLE OPTICAL FILTER TUNING DEVICE SUITABLE FOR USE IN THE RECEIVE PART OF AN OPTICAL TRANSMISSION SYSTEM

[75] Inventors: Olivier Gautheron, Montigny le Bretonneux; Christian Coeurjolly, Vitry-sur-Seine, both of France

[73] Assignee: Alcatel CIT, Paris, France

[21] Appl. No.: 281,162

[22] Filed: Jul. 27, 1994

[30] Foreign Application Priority Data

Jul. 30, 1993 [FR] France .................... 93 09425

[51] Int. Cl.⁶ .................... H04B 10/06; H04B 10/04
[52] U.S. Cl. .................... 359/194; 359/189; 359/182
[58] Field of Search .................... 359/189, 190, 359/191, 194, 195, 182; 372/6; 455/302, 306, 307

[56] References Cited

U.S. PATENT DOCUMENTS

| | | | |
|---|---|---|---|
| 4,164,650 | 8/1979 | Blackburn et al. | 359/189 |
| 5,283,845 | 2/1994 | Ip | 372/6 |
| 5,319,736 | 6/1994 | Hunt | 395/2.36 |
| 5,361,155 | 11/1994 | Chiaroni et al. | 359/182 |

FOREIGN PATENT DOCUMENTS

0534644A3  3/1993  European Pat. Off. .

OTHER PUBLICATIONS

"Method of Setting Tunable Optical Filters in a Wavelength Division Multiaccess System", *IBM Technical Disclosure Bulletin*, vol. 31, No. 11, Apr. 1989, pp. 271–274.

French Search Report FR 9309425.

*Primary Examiner*—Jose L. Couso
*Assistant Examiner*—Bhavesh Mehta
*Attorney, Agent, or Firm*—Sughrue, Mion, Zinn, Macpeak & Seas

[57] ABSTRACT

A tunable optical filter tuning device suitable for use in the receive part of an optical transmission system rejects some of the optical noise superimposed on a wanted optical signal. The device commands displacement of the characteristic of the optical filter along the wavelength axis and includes a tuning detector to detect the time at which this displacement can be stopped. The tuning detector includes an optical power detector receiving a signal from the optical filter and detects any modulation of a signal from the optical power detector. The displacement is stopped when the detector detects modulation of the signal from the optical power detector.

7 Claims, 3 Drawing Sheets

TUNABLE OPTICAL FILTER TUNING DEVICE SUITABLE FOR USE IN THE RECEIVE PART OF AN OPTICAL TRANSMISSION SYSTEM

BACKGROUND OF THE INVENTION

1. Field of the Invention

The present invention concerns a tunable optical filter tuning device suitable for use in the receive part of an optical transmission system and adapted to reject part of optical noise superimposed on a wanted optical signal and having a broader spectrum than the latter.

2. Description of the Prior Art

To prevent such filtering deteriorating the wanted optical signal transmitted by an optical transmission system it is necessary to center the passband of the filter correctly relative to the transmission wavelength of the system, i.e. relative to the wavelength of the optical carrier modulated by the signal conveying information to be transmitted by the system.

A problem then arises in that this transmit wavelength is usually not known with great accuracy when the system is first put into service or when the system is returned to service after a fault in its optical transmitter or even in service due to drift of the wavelength of the optical transmitter.

To tune a tunable optical filter used in this way in an optical transmission system when the system is first put into service or returned to service a manual procedure is usually employed which controls the filter in such a way as to displace its characteristic along the wavelength axis whilst observing the output signal of a mean optical power detector at the filter output and to stop such displacement when a certain optical power is detected by the mean optical power detector.

A particular disadvantage of this procedure is the risk of tuning said filter to a wavelength for which the optical power detected by the mean optical power detector corresponds not to a wanted optical signal but to optical noise, and in particular optical noise with a high mean power produced by a receive optical preamplifier on the input side of said optical filter.

A further disadvantage of this type of procedure is that it is not automated and can therefore be a relatively lengthy process.

Document EP-A-0 534 644 discloses the automation of tuning of an optical filter for an optical transmission system in which a distinction is drawn between two tuning phases corresponding to two types of displacement:

- a search phase in which the characteristic is displaced with a non-null mean slope until a pilot signal added to the transmitted data is detected;
- a control phase in which the displacement is controlled by a signal representative of the amplitude of the received pilot signal.

This tuning control device has the disadvantage of requiring additional circuits in the sending part to superimpose a pilot signal on the wanted signal. The receive part controlled in this way cannot be used with any conventional sending part without these additional circuits.

U.S. Pat. No. 4,164,650 described an optical filter tuning device including means for detecting a low-frequency modulation signal and deducing therefrom a correction signal to be applied to the filter and which tends to reduce to zero any error between the filter transmission wavelength and the transmission wavelength. The low-frequency modulation is produced locally by means of a squarewave signal generator and an adder which superimposes the correction signal and the squarewave signal. The correction signal is produced by a phase comparator comparing the phase of the squarewave signal and that of the low-frequency modulation signal at the output of the detector means.

This device does not include any means for automatic initial locking of the filter onto the transmission wavelength.

A particular drawback of this procedure is that said error cannot be reduced entirely to zero if it becomes too great relative to the correction capacity of said control system, determined by said amplifier and lowpass filter means.

SUMMARY OF THE INVENTION

The present invention consists in a tunable optical filter tuning device suitable for use in the receive part of an optical transmission system and adapted to reject some optical noise superimposed on a wanted optical signal, said device including means for commanding displacement of the characteristic of said optical filter along the wavelength axis and tuning detector means adapted to detect the time at which said displacement can be stopped, said tuning detector means including an optical power detector receiving a signal from said optical filter and means for detecting any modulation of a signal from said optical power detector, said displacement being stopped when said detector means detect modulation of said signal from said optical power detector.

This device therefore performs initial tuning locking using any modulation of the received optical carrier. In particular, it can use the modulation consisting of the transmitted data. It therefore requires no specific circuitry in the transmitter part.

Other objects and features of the invention emerge from the following description of embodiments of the invention given with reference to the appended drawings.

DETAILED DESCRIPTION OF THE PREFERRED EMBODIMENTS

Figure 1:
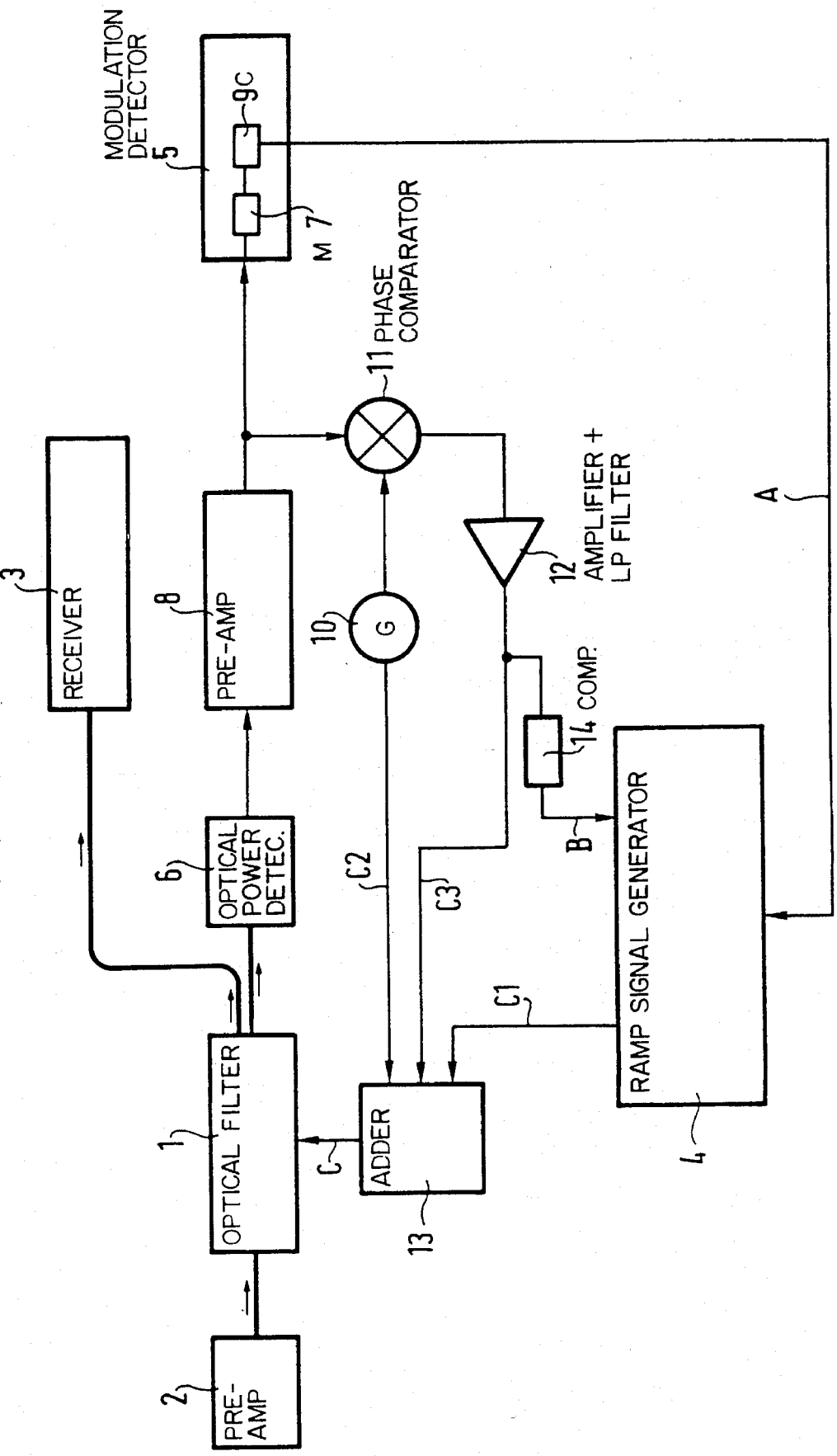
FIG. 1 shows a first embodiment of a device of the invention.

FIG. 1 shows a tunable optical filter 1 which in this example is a Fabry-Pérot optical filter. The filter is used in the receive part of an optical transmission system on the output side of an optical preamplifier 2 and driving a receiver 3.

Figure 2:
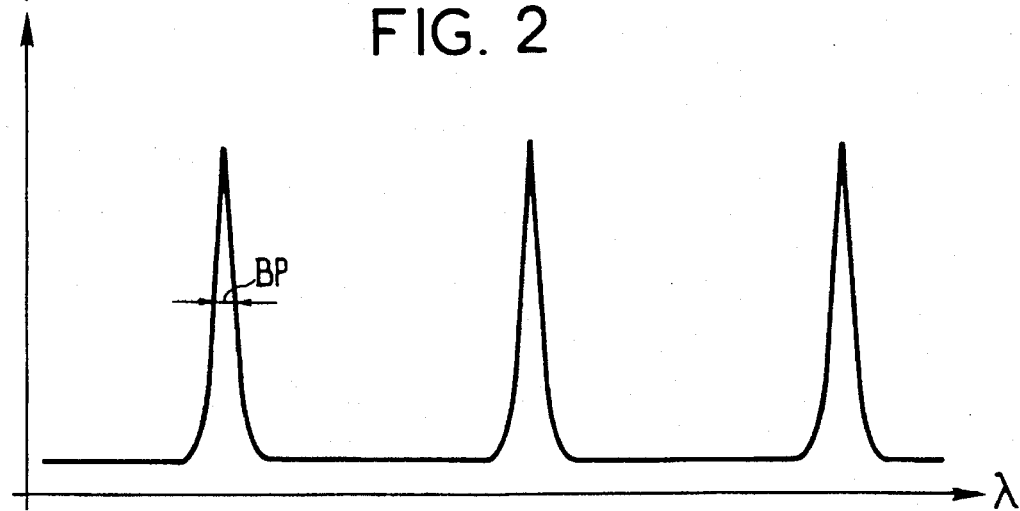
FIG. 2 shows the general shape of the characteristic of a tunable optical filter such as a Fabry-Pérot optical filter, for example.

FIG. 2 shows the general shape of the characteristic of a Fabry-Pérot optical filter. The wavelength $\lambda$ is plotted on the abscissa axis and the optical power ratio $P_1/P_0$ is plotted on the ordinate axis. $P_0$ is the optical power at the filter input and $P_1$ is the optical power at the filter output.

This characteristic features a succession of peaks whose mid-height width defines the passband BP of the filter. The various wavelengths at which the various peaks are centered define the various transmission wavelengths of the filter.

The tuning device for the tunable optical filter 1 shown in FIG. 1 includes means for commanding displacement of the characteristic of the optical filter 1 along the wavelength axis and tuning detector means for detecting the moment at which said displacement can be stopped.

The means for commanding displacement of the characteristic of the optical filter 1 along the wavelength axis include a ramp signal generator 4 for applying a ramp control signal C1 to the filter 1. The ramp control signal causes the filter characteristic to be displaced linearly along the wavelength axis, or at least along a portion of that axis corresponding to the excursion of said ramp signal.

Figure 3:
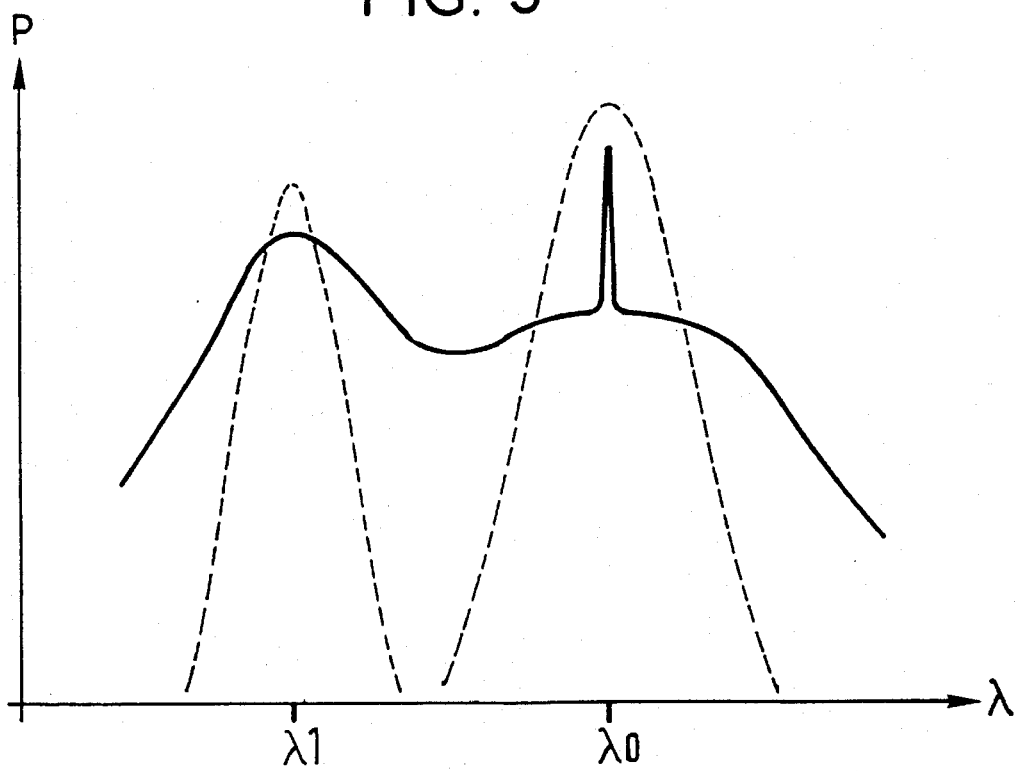
FIG. 3 shows the general shape of the curve giving the output optical power of an optical amplifier, such as a doped fiber optical amplifier, for example, as a function of the wavelength and for a given optical amplifier input optical power.

The general shape of the curve giving the output optical power of the optical preamplifier 2 as a function of the wavelength for a given input optical power of the optical amplifier, in the case of a doped fiber optical amplifier, for example, is shown in FIG. 3 in which the wavelength $\lambda$ is plotted on the abscissa axis and the optical power P is plotted on the ordinate axis.

On this curve the wanted optical signal is represented by a relatively narrow peak (in practice this peak has a width of a few tenths of nm, for example) centered on the transmission wavelength $\lambda 0$ (in practice equal to 1.55 µm, for example), and of relatively high power.

The optical noise due to the optical preamplifier has a much broader spectrum (in practice this bandwidth is equal to a few tens of nm, for example) and also has a relatively high optical power, especially around a wavelength $\lambda 1$ (equal to 1.53 µm in practice, for example).

FIG. 3 also shows in dashed line the general shape of one of the peaks of the characteristic of a Fabry-Pérot filter as shown in FIG. 2, for two separate positions of the center wavelength of this peak, one corresponding to the wavelength $\lambda 1$ and the other to the wavelength $\lambda 0$. This shows the risk of tuning said optical filter to the wavelength $\lambda 1$ instead of the wavelength $\lambda 0$, for example if the criterion used is a simple tuning detection criterion based on observation of the output signal of a mean optical power detector at the output of said optical filter.

To enable tuning of the optical filter to the transmission wavelength $\lambda 0$, rather than to a wavelength such as the wavelength $\lambda 1$, said tuning detection is effected in a device of the invention by modulation detector means 5 receiving the signal from an optical power detector 6 at the output of the optical filter 1.

The modulation detector relies on the fact that, after optical power detection by the optical power detector 6, the electrical noise corresponding to said optical noise has a spectrum which, although broader than that of the electrical signal conveying the information to be transmitted and corresponding to said wanted optical signal, after optical power detection by the optical power detector 6, has at each frequency in this spectrum an amplitude very much smaller than that for the spectrum of the electrical signal conveying the information to be transmitted; for the situation specifically considered here of optical noise created by an optical amplifier, this is with the exception of the null frequency, because said optical noise then has a high mean optical power.

The modulation detector means 5 include, in the example shown:

means 7 for measuring a magnitude characteristic of the amplitude of the signal received from the optical power detector 6 via a preamplifier 8, this characteristic magnitude being a value other than the mean value (for example, the peak value or the root mean square value), and the measuring means having a bandwidth excluding the null frequency and including all or some of the frequencies forming the spectrum of the electrical signal conveying the information to be transmitted, means 9 for comparing the result supplied by these measuring means to a threshold, for example a threshold determined experimentally; if the signal received by the modulation detector means consists entirely of noise the result supplied by these measuring means is below this threshold and, otherwise, the result supplied by these measuring means is above this threshold.

In the case under consideration the measuring means 7 are such that the comparison effected by the means 9 is effected in the sense indicated above, but it would obviously be possible to do this in some other way.

If the modulation detector means do not detect any modulation of the signal applied to them, i.e. in this example if the result supplied by said measuring means is below said threshold, generation of said ramp control signal is commanded, in this example by means of a signal A from the means 9 applied to a control input of the ramp signal generator 4.

If the modulation detector means 5 detect modulation of the signal applied to them, i.e. in this example if the result supplied by said measuring means is above said threshold, generation of said ramp control signal could cease, especially if there is no intertia in the control system of the optical filter, and this would achieve the required tuning.

In the example shown the generation of a ramp control signal (and therefore the displacement of the optical filter characteristic) continues after the modulation detector means have detected modulation of the signal applied to them, however, and the ramp control signal generated at this time advantageously has a slope which is lower in absolute value than that of the ramp control signal generated when the modulation detection means do not detect any modulation of the signal applied to them.

The generation of this ramp control signal with the advantageously lower slope is commanded, as will now be described, by control loop means adapted to maintain said tuning in service.

In this example the control loop means include:

a generator 10 producing the control signal for the optical filter 1, which is a low-frequency sinusoidal control signal C2, a phase comparator 11 receiving the signal from the generator 10 and the signal from the power detector 6, in this example via the preamplifier 8, amplifier and lowpass filter means 12 processing the signal from the phase comparator 11 to obtain a correction signal C3 applied to the optical filter 1 to reduce the error between the transmission wavelength of the Fabry-Pérot optical filter 1 for which said tuning has been detected and the transmission wavelength, in the event that either of these wavelengths has drifted.

The control signals C1, C2 and C3 for the optical filter 1 are superimposed by an adder 13 to give a control signal C applied to the filter.

The tuning control device shown in FIG. 1 further comprises means 14 for comparing the correction signal C3 from the amplifier and lowpass filter means 12 with a threshold value. The output signal B of the means 14 controls the generation of said ramp control signal of advantageously lower slope, in absolute value, this generation being continued in this example when said correction signal is greater than said threshold value and being stopped otherwise.

The generation of this ramp control signal of advantageously lower slope after said modulation detector means have detected modulation of the signal applied to them prevents a situation occurring in which the error between the transmission wavelength of the Fabry-Pérot optical filter 1 for which said tuning has been detected and the transmission wavelength, due to one or other of these wavelengths drifting, exceeds the correction capacity of said control loop means.

In this example the lower slope ramp is generated by the same generator 4, the choice of the slope of the ramp produced by this ramp generator being commanded by the signal A from the modulation detector means, said lower slope being selected when the means 5 detect modulation of the signal applied to them.

Note also that when the modulation detector means have detected modulation of the signal applied to them it is necessary to determine the sense of the ramp to be applied, this sense depending on the sign of the correction signal C3. It can therefore be indicated by the signal B.

The sense of the ramp applied when the modulation detector means have not detected modulation of the signal applied to them can be fixed once and for all, however; it can also be fixed by means of the signal B, for example, because the correction signal C3 has a particular sign during such application.

Figure 4:
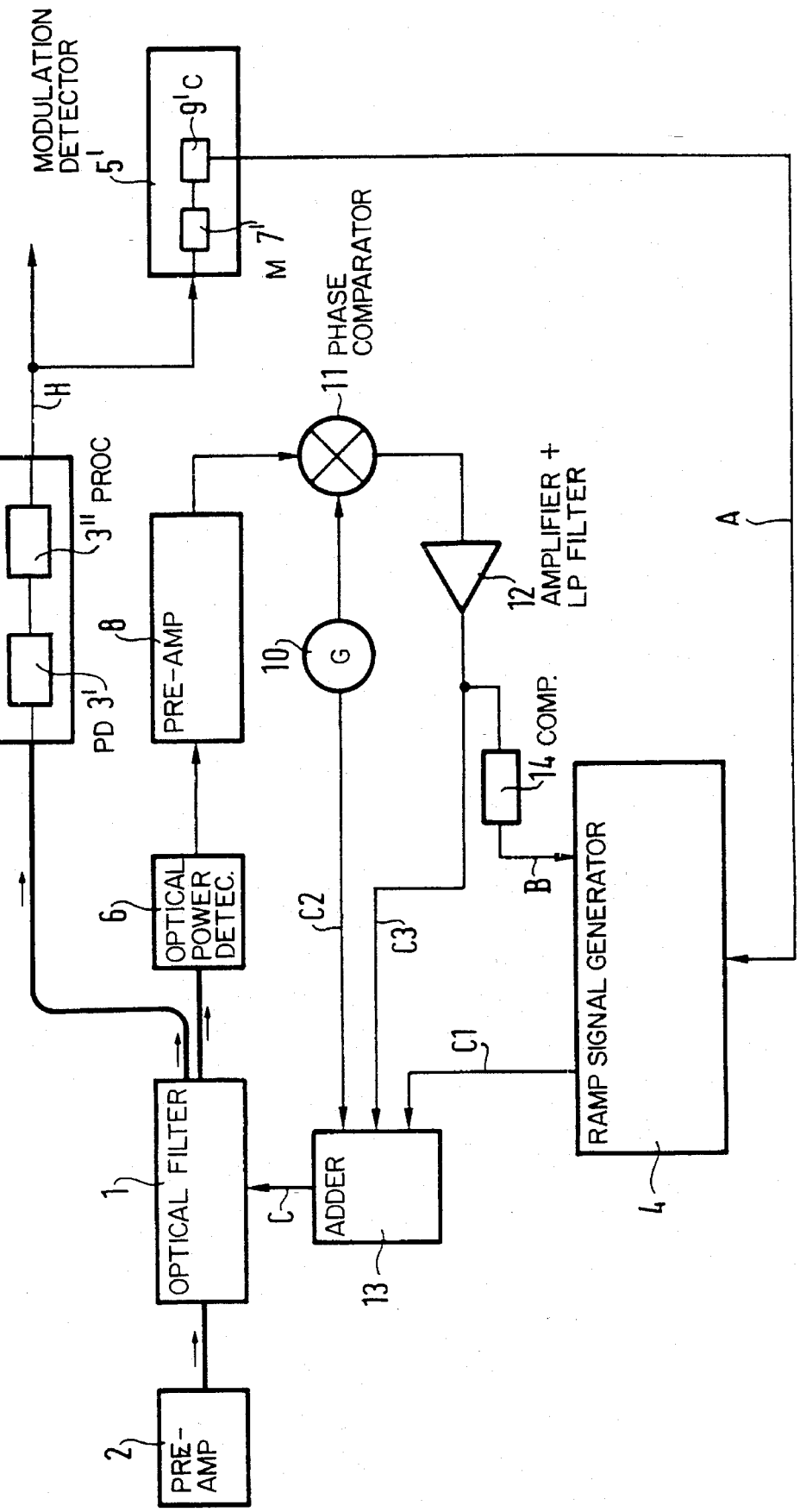
FIG. 4 shows a second embodiment of a device of the invention.

The embodiment shown in FIG. 4 differs from that shown in FIG. 1 only in terms of the location of the modulation detector means 5', which here are on the output side of the receiver 3.

In the embodiment shown in FIG. 4 the information transmitted is digital information and the modulation detection means 5' use a clock signal H whose clock rate corresponds to the transmission rate of said information, as recovered by the receiver 3. The measuring means 7' of the means 5' measure a magnitude characteristic of the amplitude of this clock signal and the bandwidth of these measuring means can be restricted to the frequency of the clock signal.

In this example the modulation detector means 5' use a signal from processor means 3", optionally including a preamplifier, included in the receiver 3 and receiving a signal from an optical power detector 3' which is also part of the receiver 3.

Whether the information transmitted is digital or analog, the modulation detector means 5' could use a signal corresponding to the information transmitted, recovered by the receiver 3, rather than the recovered clock signal 8.

Note also that an alternative embodiment could include a single optical power detector and associated preamplifier rather than two separate optical power detectors 3' and 6 and their respective associated preamplifiers.

Note also that any of these various embodiments can be used not only when said signal conveying information to be transmitted modulates the intensity of said optical carrier but also when it modulates some parameter of the optical carrier other than its intensity, provided that means are provided for converting such modulation to intensity modulation before it reaches the optical power detector used in the device.

There is claimed:

1. A tunable bandpass optical filter tuning device suitable for use in the receive part of an optical transmission system for transmitting an information signal containing a spectrum of frequencies, and adapted to reject some optical noise superimposed on a wanted optical signal, said device including means for commanding displacement of the passband of said optical filter along a wavelength range, and tuning detector means adapted to detect the time at which said displacement can be stopped, said tuning detector means including an optical power detector receiving an optical signal from said optical filter, and modulation detector means for detecting any modulation of an electric signal from said optical power detector with the exception of a null frequency of said electric signal, said, displacement being stopped when said modulation detector means detects modulation of said electric signal from said optical power detector; wherein, said optical noise comprising noise created by a receive optical preamplifier, said modulation detector means comprises;

measuring means for measuring a magnitude characteristic of the amplitude of said electric signal from said optical power detector other than its mean value, said measuring means having a bandwidth excluding said null frequency and including some or all of the frequencies forming the spectrum of the information signal conveying information to be transmitted by the system; and means for comparing a result supplied by said measuring means to threshold so that, according to whether the optical signal received by said optical power detector is entirely constituted of said optical noise or not, the result supplied by said measuring means is differently situated relative to said threshold, 2. The device according to claim 1, further comprising tuning maintaining means including control loop means including means for producing a correction signal applied to said filter and further comprising:

means for continuing to command displacement of the passband of said optical filter after said modulation detector means has detected modulation of said electric signal from said optical power detector, means for comparing said correction signal with a threshold, and means for stopping said displacement according to the situation of said correction signal relative to said threshold.

3. A device according to claim 2, wherein said displacement is effected by applying a ramp control signal to said filter, and wherein said means for continuing to command said displacement when said modulation detector means has detected modulation of said signal from said optical power detector comprises means for applying to said filter a ramp control signal of lower slope, in absolute value, than the ramp control signal applied to said filter when said modulation detector means has not detected modulation of said electric signal from said optical power detector.

4. Device according to claim 1 characterized in that, when used in the receive part of an optical transmission system, said modulation detector means are means for detecting the modulation of a signal from a receiver implementing a receive function.

5. Device according to claim 4 wherein, when the information conveyed by said system is digital information, said signal from said receiver is a clock signal with a clock rate corresponding to the transmission rate of said information.

6. Device according to claim 5 wherein, when said optical noise comprises noise created by a receive optical preamplifier, said modulation detector means include:

measuring means for measuring a magnitude characteristic of the amplitude of said clock signal, said measuring means having a bandwidth which can be restricted to the frequency of said clock signal, and means for comparing a result provided by said measuring means with a specific threshold so that, depending on whether the signal received by said optical power detector is entirely constituted of said optical noise or not, the result supplied by said measuring means is differently situated relative to said threshold.

7. A tunable bandpass optical filter tuning device suitable for use in the receive part of an optical transmission system for transmitting an information signal containing a spectrum of frequencies, and adapted to reject some optical noise superimposed on a wanted optical signal, said device including means for commanding displacement of the passband of said optical filter along a wavelength range, and tuning detector means adapted to detect the time at which said displacement can be stopped, said tuning detector means including an optical power detector receiving an optical signal from said optical filter and modulation detector means for detecting any modulation of an electric signal from said optical power detector with the exception of a null frequency of said electric signal, said displacement being stopped when said modulation detector means detects modulation of said electric signal from said optical power detector;

wherein a pilot carrier signal frequency is not transmitted with the information signal for tuning said filter.

* * * * *